United States Patent [19]

Garotta

[11] 4,242,742
[45] Dec. 30, 1980

[54] PROCESS FOR ELIMINATING LONGITUDINAL WAVE COMPONENTS IN SEISMIC EXPLORATION

[75] Inventor: Robert J. Garotta, Chatenay Malabry, France

[73] Assignee: Compagnie Generale de Geophysique, France

[21] Appl. No.: 19,034

[22] Filed: Mar. 9, 1979

[30] Foreign Application Priority Data

Mar. 22, 1978 [FR] France ................................ 78 08310

[51] Int. Cl.³ ............................ G01V 1/00; G01V 1/28
[52] U.S. Cl. ........................................ 367/75; 181/111
[58] Field of Search ................... 367/75; 181/106, 111, 181/113, 121

[56] References Cited

U.S. PATENT DOCUMENTS

| | | | |
|---|---|---|---|
| 2,880,816 | 4/1959 | Widess et al. | 367/75 |
| 3,835,954 | 9/1974 | Layotte | 367/75 |
| 4,064,964 | 12/1977 | Norden | 181/121 |
| 4,124,090 | 11/1978 | Reynolds | 181/121 |

*Primary Examiner*—Howard A. Birmiel
*Attorney, Agent, or Firm*—Schwartz, Jeffery, Schwaab, Mack, Blumenthal & Koch

[57] ABSTRACT

A seismic exploration process consisting of the application to the surface of the soil of a plurality of vertical impacts at points separated by a vertical trench cut into the soil. The vibrations propagating in the soil as a result of said impacts are then recorded, with the longitudinal wave components being eliminated from consideration. This makes it possible to produce agitation having a strong transverse wave component.

4 Claims, 1 Drawing Figure

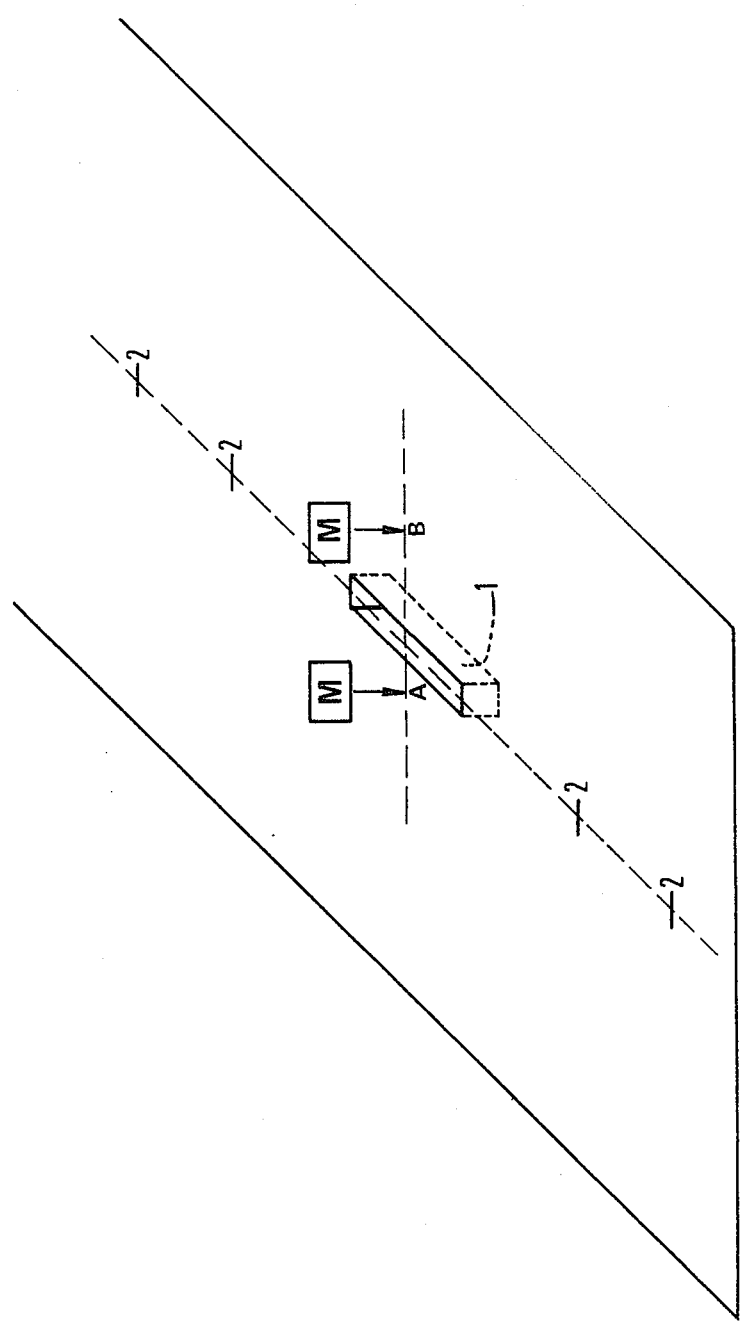

PROCESS FOR ELIMINATING LONGITUDINAL WAVE COMPONENTS IN SEISMIC EXPLORATION

BACKGROUND OF THE INVENTION

The present invention concerns the seismic exploration of the subsoil. Seismic exploration consists of imparting agitation to certain points of the soil which in turn propagates from such points of application, and of collecting at other points measurements of the vibrations propagated to these points, by means of seismic sensors. The analysis of the signals received makes it possible to reconstitute information concerning the layers of the terrain traversed by the seismic waves.

The precision of the information reconstituted in this manner is an inverse function of the speed of wave propagation, because the instants at which the waves arrive at the several points of measurement may be differentiated more accurately.

It is known that seismic waves may be composed of two types of vibration: longitudinal waves vibrating in the direction of the propagation of agitation and transverse waves which vibrate perpendicularly to said direction of propagation (and therefore in a plane tangent to the surface of the wave of the agitation imparted). Of these two types of waves, the second one propagates at a substantially lower velocity.

SUMMARY OF THE INVENTION

According to the present invention, agitations having a strong transverse wave component are produced, initially to improve the accuracy of the measurements, but also to obtain highly useful supplementary information from a comparison of the propagation of the longitudinal and transverse waves and particularly from the ratio of their propagation velocities, or from the amplitudes of the waves reflected by each of the waves (the acoustic impedance not being the same for the two types of waves).

Heretofore, special equipment has been used to generate agitations having a sufficiently large transverse component to allow effective interpretation of the measurements. Attempts have been made to emit transverse waves by means of an oscillating mass laterally striking the edge of a trench dug in the soil, or laterally striking a foundation anchored in the soil. If such a foundation is impacted alternatively on its sides, the polarity of the transverse waves is reversed on the two recordings obtained. The combination of the recordings may be used to eliminate the longitudinal waves emitted simultaneously with the transverse waves.

It has also been proposed to employ a horizontal vibrator acting on a plate imbedded in the soil. In this case, however, it is difficult to separate the signals due to longitudinal waves from those generated by transverse waves.

All of these processes have the very serious disadvantage that they utilize specific equipment which cannot be used to generate compression waves. The present invention proposes a process capable of generating transverse waves by applying surface sources usually employed to create longitudinal waves. For this purpose, two vertical impacts or two vertical vibrations are applied to the surface of the soil at two points separated by a vertical trench cut into the soil and the subsequent vibrations propagating in the soil are recorded. The impacts are preferably created by dropping a mass onto the soil, at two points symmetrical with respect to the trench. The energy of the agitation is thus emitted directly at the surface of the soil, without it being necessary, as in the above mentioned process of the prior art, to provide a plate anchored in the soil, to ensure the transfer of energy toward the soil. The transverse wave components produced may be utilized because of the dissymmetry of the mechanical properties of the material surrounding the points of impact, said dissymmetry being created by the trench between the points of impact.

By recording the vibrations due to both the waves emitted as the result of the first impact on one side of the trench and those emitted after the second impact on the other side, the vibrations due to the longitudinal component of the agitation may be eliminated. This elimination is effected by forming the difference of the recordings obtained after each impact, because the longitudinal component is the same in both impacts.

BRIEF DESCRIPTION OF THE APPLICATION DRAWING

The single drawing FIGURE schematically illustrates the invention.

DETAILED DESCRIPTION OF THE PREFERRED EMBODIMENT

A trench 1 is cut into the soil, to a depth of a few decimeters, for example 30 to 50 centimeters, a width of approximately 3 to 10 centimeters and a length of 10 to 100 meters. Agitation is created by dropping a mass M at points A and B placed on either side of said trench, symmetrically with respect to the trench. Because the trench is vertical, the position of the point of impact has no effect at all on the propagation of the longitudinal components of the agitations and said component is the same whether the impact is applied on one side or the other of the trench.

The transverse component vibrates parallel to the interface plane created by the trench and it changes its sign depending on whether the impact is applied to one side or the other of the trench. The seismic signals propagated subsequent to the dropping of the mass at the two points, generated both by the propagation of the longitudinal and the transverse wave components, are then successively recorded by means of seismographs 2 positioned on the surface, the seismographs being on a horizontal axis perpendicular to the trench.

Because the longitudinal components are identical in both cases, they may be eliminated by subtracting one of the two recordings from the other.

A longitudinal waves emitted may be recorded simultaneously by placing seismographs with vertical axes next to the seismographs 2. In this manner, both longitudinal and transverse waves are obtained from the same emission.

This improves the information concerning the layers transversed by the analysis, that is, the ratios of the propagation velocities of the longitudinal waves to those of the transverse waves.

The agitation may be emitted alternatingly at either side of the trench by other means, for example by a vibrator acting vertically on either side of the trench, or by any other surface source.

I claim:

1. A method of seismic exploration, including the steps of applying to the surface of the soil a plurality of vertical impacts at points separated by a vertical trench cut in the soil, recording the vibrations propagating in the soil subsequent to and as a result of each impact, and subtracting recordings resulting from impacts on one side of the trench from recordings resulting from impacts at corresponding locations on the other side of the trench, in order to eliminate the effect of longitudinal waves created by the impacts.

2. The method according to claim 6, wherein said vertical impacts are two in number and are created by the dropping of a mass onto the soil on either side of said trench.

3. The method according to claim 1 or 2, characterized in that the trench has a depth of approximately 30 to 50 centimeters.

4. The method according to claim 1 or 2, characterized in that the points of impact are symmetrical with respect to the trench.